Feb. 2, 1943.  G. D. AGNEW  2,310,015
WELDING APPARATUS
Filed Oct. 2, 1941
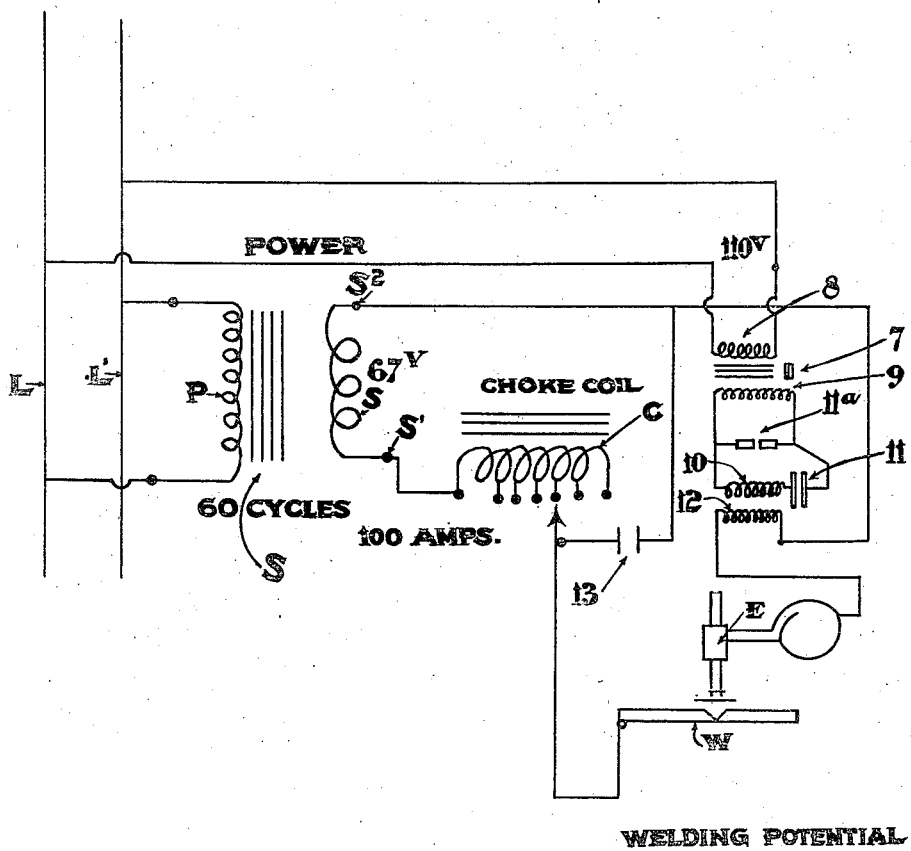
INVENTOR
GEORGE D. AGNEW
BY Fetherstonhaugh & Co.
ATTORNEYS Patented Feb. 2, 1943

2,310,015

UNITED STATES PATENT OFFICE 2,310,015

WELDING APPARATUS

George D. Agnew, Kingston, Ontario, Canada

Application October 2, 1941, Serial No. 413,339
In Canada June 6, 1941

1 Claim. (Cl. 219—8)

This invention relates to welding apparatus and the object is to prevent the accidental extinction of the welding arc which frequently occurs when the operator inadvertently increases the distance between the movable electrode, which constitutes one terminal of the welding circuit, and the work which constitutes the remaining terminal of said circuit. If the air gap between these two terminals is accidentally increased beyond a certain point the resistance of the gap results in breakdown and extinction of the welding arc. In this connection it may be pointed out that the welding current employed is usually a relatively low frequency, low voltage, high amperage current.

In ordinary practice the welding current employed is a 60 cycle alternating current of a voltage value of approximately 67 volts and an amperage value of approximately 50 to 100 amperes. When the gap between the work, constituting one terminal of the welding circuit, and the movable electrode, constituting the remaining terminal of the circuit, is inadvertently lengthened beyond a certain point by the welder the current will not bridge this gap and the welding arc will fail. In order to overcome this difficulty it is proposed to superimpose on the normal welding current a second high frequency, high voltage, low amperage current which serves to maintain the welding arc even though the gap between the terminals of the welding circuit be inadvertently lengthened by the operator. Such failure also occurs when an attempt is made to weld thin gauge material at low current value of the order of 20 to 30 amperes.

The superposed current is a radio frequency, that is to say, in the neighborhood of 500,000 cycles. The amperage of this current is relatively low being in the neighborhood of 25 milliamperes but the voltage is high, being in the neighborhood of about 3,000 volts. This superimposed current serves to maintain the gap between the welding terminals in such an ionized condition that even when this gap is inadvertently lengthened by the operator the conductivity of the path between the terminals will, due to the ionizing action of the superimposed current, be sufficient to ensure that the welding current will bridge this gap in the form of a welding arc.

There are various ways in which a high frequency current employed for maintaining the arc may be superimposed on the normal welding current, based on the idea of supplying the terminals of the welding circuit with two different currents, one being the normal welding current which is a high amperage current of relatively low frequency and low voltage and the other being a low amperage arc maintaining current which is of relatively high frequency and high voltage.

The preferred method of carrying out my invention is illustrated in the accompanying drawing in which:

The figure is a diagrammatic sketch of a welding transformer with primary and secondary circuits connected up with the article to be welded.

Referring to the drawing S designates an ordinary welding transformer having its primary P connected across the line wires L and L'. The secondary S has one terminal S' connected through a choke coil C to the work W which constitutes one terminal of the arc-welding circuit. The remaining terminal $S^2$ of the secondary S is connected to the movable electrode E which constitutes the remaining terminal of the arc welding circuit. This comprises the ordinary welding circuit by which the terminals W and E are supplied with an alternating current at a frequency of about 60 cycles, the voltage of the current being in the neighborhood of about 67 volts and the amperage being in the neighborhood of 100 amperes.

The second transformer indicated at 7 has its primary winding 8 also connected across the line wires L and L'. The output voltage from the secondary 9 of the transformer 7 is in the neighborhood of 3,000 volts. An induction coil winding 10 and a condenser 11 are connected in series with each other across the secondary 9 of the transformer 7. A spark gap 11a is also connected across the secondary 9 in parallel with the winding 10 and the condenser 11. The winding 10 may constitute one of the windings of an induction coil, the other winding of which is indicated at 12 and is in series with the welding terminal E and the secondary S of the welding transformer 5. A by-pass condenser 13 is connected across the welding circuit in parallel with the welding terminals W and E. The spark gap 11a, the condenser 11 and the windings 10 and 12 constitute, in effect, a Tesla oscillating circuit by means of which the frequency of the high tension current supplied by the secondary winding 9 of the transformer 7 is raised from a frequency of 60 cycles to a radio frequency of about 500,000 cycles. It may be noted here that the transformer 7 is a step-up transformer which raises the voltage of the current supplied thereto from the line voltage to approximately 3,000 volts. It will thus be seen that the winding 12 carries both the normal welding current and the superimposed high frequency current. Vacuum tubes or other means for imposing on the normal welding current a second high voltage low amperage radio frequency current may be employed instead of the arrangement shown in the drawing.

Having thus described my invention, what I claim is:

Welding apparatus comprising welding electrodes, a low voltage welding transformer for supplying welding current to said electrodes, a choke coil through which one terminal of the secondary of said transformer is connected to one of said electrodes, an induction coil winding through which the remaining terminal of the secondary of said transformer is connected to the remaining electrode to complete the welding circuit, a by-pass condenser having one terminal connected to the choke coil side of the welding circuit at a point between the choke coil and the electrode connected thereto, the remaining terminal of said condenser being connected to the opposite side of the welding circuit at a point between the transformer secondary and said induction coil winding, an auxiliary high voltage transformer, a second induction coil winding and a condenser connected in series with each other across the secondary of the high voltage transformer and a spark gap also connected across the secondary of the high voltage transformer in parallel with the second induction coil winding and the last mentioned condenser, said second induction coil winding being disposed in inductive relation with the first mentioned induction coil winding.

GEORGE D. AGNEW.